July 8, 1958 — N. L. HARVEY — 2,842,764
COLLISION WARNING RADAR
Filed Feb. 21, 1951 — 2 Sheets-Sheet 1

INVENTOR
NORMAN L. HARVEY
BY Paul S. Martin
ATTORNEY

United States Patent Office 2,842,764
Patented July 8, 1958

2,842,764

COLLISION WARNING RADAR

Norman L. Harvey, Eggertsville, N. Y., assignor to Sylvania Electric Products Inc., a corporation of Massachusetts Application February 21, 1951, Serial No. 212,088

4 Claims. (Cl. 343—14)

The present invention relates to an improvement in radio ranging systems.

In specialized circuit applications, it is sometimes desirable that the exact range of a moving target be recognized, this range to be a predetermined value. Comparable devices heretofore have been known in which an oscillator radiates a signal that is reflected from the object in the radiation pattern of the oscillator antenna, and because of the relative travel between the oscillator and that object, a doppler beat signal is available. This doppler beat is very weak for great separations and rises in intensity as the distance between the ranging unit and the object being detected decreases. Such a device, which depends for range indication purely on the amplitude of the signal, is affected by the size of the reflecting object and numerous other factors so that the signaling of a predetermined range is of limited accuracy. Accordingly, an object of the present invention is to provide a ranging device for the detection of a relatively moving object at a critical separating distance. This is accomplished in the illustrative disclosure below which employs a complex wave form of angular modulation of the oscillator and a narrow band-pass filter in the system between the utilization point and the point where the locally generated signal and the reflected signal are heterodyned.

The introduction of modulation converts the system into one utilizing the principles of cross-correlation, for significant advantages. Two signals can be cross-correlated by taking their cross-product and integrating the result. This result is a maximum for modulated carriers when their phase and wave-form is in coincidence. In a ranging system employing a common device for signal generation and cross-multiplying, coincidence is realized for a critical distance (as will be seen) depending on the transmission delay, and not solely on signal amplitude as in comparable known ranging systems.

Either periodic modulation of various wave-forms can be used, or random or "noise" modulation can be used. In periodic systems a maximum correlation is attained (for signals of reasonable strength) not only at the induction field area of the device, but also in a critical range beyond the induction field area. Random modulation results in discrimination at all ranges beyond the near-zero transmission-time range.

Figure 1:
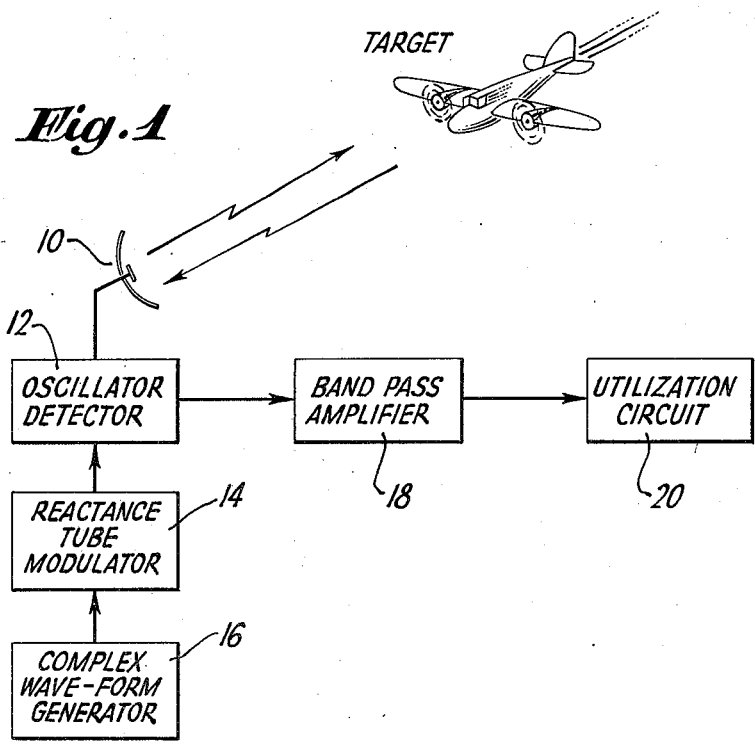
Figure 2:
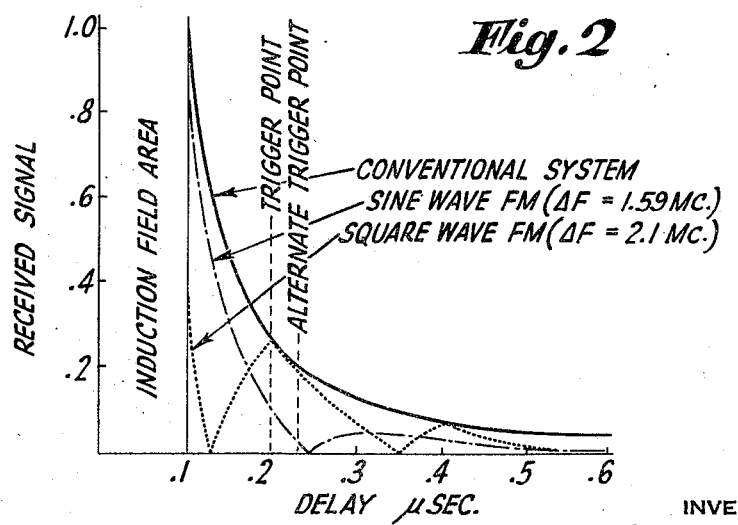
Figure 3:
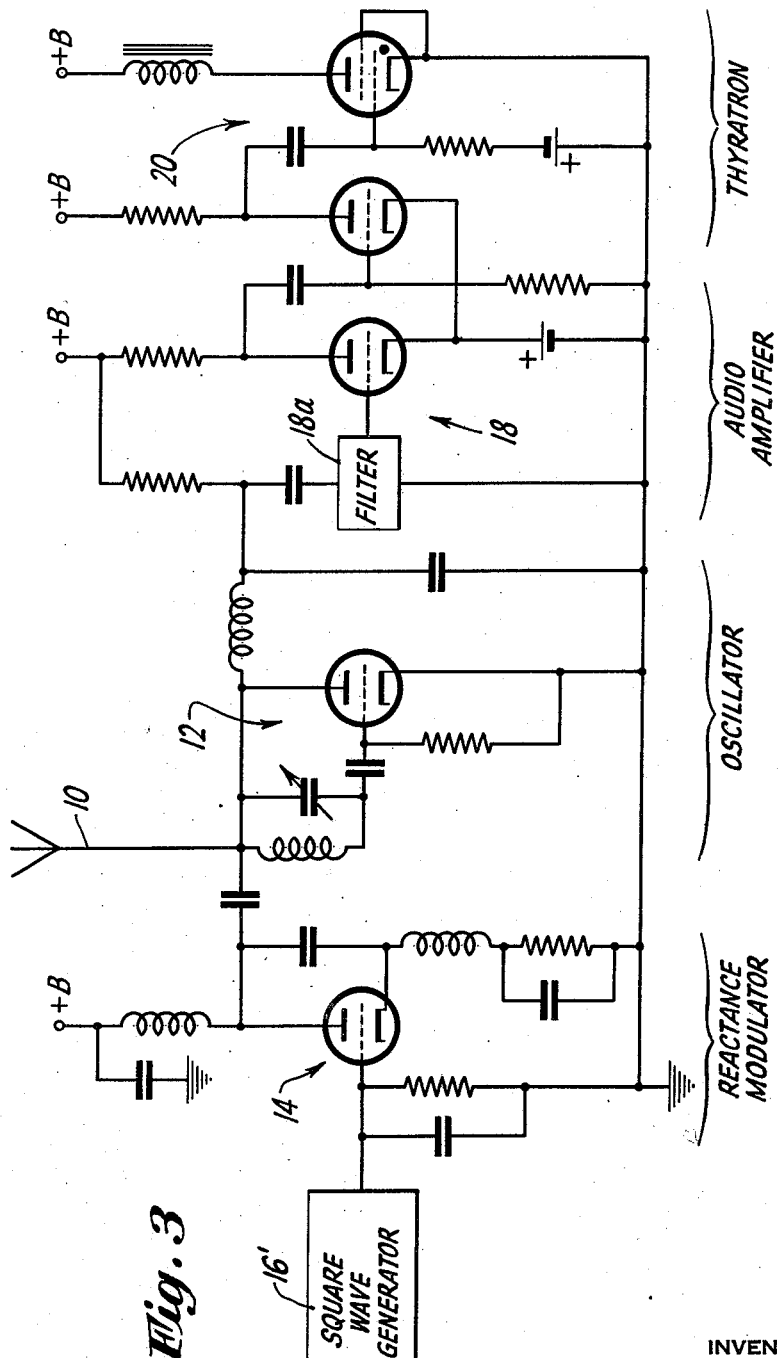

The nature of the invention and its various novel aspects will be better appreciated from the following detailed discussion of an illustrative embodiment shown in the accompanying drawings, wherein Figure 1 is a block diagram illustrating one form of this device, Figure 2 is a graph representing the performance of the novel device in contrast to a previously known system, and Figure 3 is a specific wiring diagram of the device in Figure 1.

In Figure 1 an antenna 10 is shown for radiating a signal toward a target represented by an approaching airplane. A radio frequency signal is supplied to antenna 10 by unit 12 which contains an oscillator and which is also adapted as a mixer to heterodyne or cross-multiply any reflection from a target with the locally generated signal. Unit 12 is coupled to a frequency modulator including a reactance tube-angle-modulating stage 14 and a generator 16 for providing a complex wave form of modulation. Unit 16 advantageously is a square wave generator; or some other complex periodic wave-form of modulation may be preferable; but it could in the alternative be replaced by a noise generator as indicated above.

The reflection from a relatively approaching (or receding) target will produce a doppler beat note in unit 12. If the reactance tube and the modulation signaling source were not operating, that is, if the reactance tube and the modulation signalling source were omitted from the system shown so as to resemble known devices, there would be a sustained doppler note which would depend in frequency on the relative velocity of the target and antenna 10. This signal is impressed on band-pass amplifier 18 containing a filter designed to transmit only a narrow band of frequencies corresponding to the relative target velocities anticipated. Utilization circuit 20 receives the amplified and reflected signals from unit 18, and this can be either a signal-indicator or a tripper for any desired automatic device intended to respond to the doppler note. The output of such a system is a function of the delay, as indicated by the heavy curve in Figure 2, and it is also heavily dependent on reflected-signal strength. Such system is readily affected by interference.

With reactance tube modulator 14 and modulation generator 16 in operation, the output of unit 12 depends not only upon the production of a doppler note but also critically on the range of the target in relation to the antenna; and the system operates in dependence on correlation of the received and the transmitted signals and is thus of vastly improved immunity to spurious signals. This is because the relative form and phase between the transmitted and the received signals is of significance. With certain phase conditions, the two signals are mutually cancelling. Although a doppler note might be produced there is no detector output. With certain periodic forms of modulation the output can be arranged to have a usefully large but nonetheless critical in value and rate-of-change at a substantial target range and before the large increase in signal characteristic of zero range. This is diagrammatically illustrated in Figure 2. The heavy curve representing the conventional system shows how the useful output rises as the delay represented by the time of transmission and reflection from the target decreases. It would be impractical to rely upon any particular value of such a signal to provide an indication of range because of the numerous factors affecting the amplitude of the reflection. With a device that is an efficient reflector, a large signal might be received at a great range whereas a less efficient reflector would produce that same signal amplitude at a much closer range.

When a frequency modulated signal of sine-wave modulation form is transmitted, the dot-dash curve shows that there is very little signal level produced for all ranges beyond a critical one at which the signal passes through zero, and there is a rather sharp rise, compared to the curve representing the operation of the conventional system. Because of this modulation form, excellent discrimination against spurious signals is obtained. However, the reliable output is effective only at a rather close range, is somewhat amplitude sensitive, and may not be useful in some applications. Where a complex wave form of modulation is used, square-wave modulation being a desirable form of complex modulation, the signal goes through multiple rises and reverses, with a comparatively large rise and sharp reverse at about two micro seconds delay in transmission and reflection. Utilization circuit 20 can contain a thyratron with a control device in its output circuit, the thyratron being arranged to respond to a predetermined minimum level. That level can be the "alternate trigger point" in Figure 2 which as seen in the dotted line in Figure 2, reaches a usefully large and relatively critical value. The sharp reverse at the 0.2 micro second delay time can also be used to advantage in a differentiating circuit responsive to a rise-and-fall of abrupt character.

The complex form of modulation in the frequency-modulation radar used thus provides a usefully large response before the distance range is reached and additionally it provides a useful sharp rise and reverse for response at a critical range; and in addition the form of modualtion is of immense value in distinguishing the radiated signal from spurious signals that might be received even by the directional antenna.

The operation of the system may perhaps be explained in the following manner. Unit 12 serves to cross-multiply the signal which it generates with the signal that it receives. For a certain range of separation between the target and the antenna, this cross product is a maximum. The modulation which is of complex but preferably cyclicly repeating form does not change this condition, the signal in unit 12 received after reflection being cross-multiplied with the signal from the modulator. The cross product of these signals is a maximum for a predetermined target range. If the relative target velocity were zero, this maximum output would be a signal of zero frequency, or simply a direct-current voltage. The output of unit 12 would increase in the presence of various spurious signals, but filter 18 which is of narrow band characteristics is selected to favor the modulation cross-product which is developed at the doppler frequency. This sharp filter integrates the cross-product and in this way eliminates the spurious signals. Band-pass amplifier 18 is accordingly made of narrow band design, and is of a frequency corresponding to the particular doppler-beat for which the equipment is intended to be used. The modulation frequency is here made greater than the half-band width of the filter for effective integration.

In Figure 3 the specific wiring diagram is shown, involving certain circuit portions of well known design. Antenna 10 and all of the circuit to the right of the antenna operate different from a known form of apparatus for the same purpose. This apparatus includes a single-tube oscillator 12, a band-pass amplifier 18 and a utilization circuit 20. The filter 18a passes only the doppler frequency related to the particular relative velocities to be detected; but unlike the usual device filter, 18a acts as an integrator, in achieving cross-correlation, of the signals fed by the reactance modulator 14 and square wave generator 16' to the oscillator and by antenna 10 (echo as received) to that oscillator. These signals, cross-modulated, are integrated by the filter and thereby the resulting signal is relayed to the utilization circuit illustrated as containing a thyratron.

Where the complex wave form of modulation is used together with the narrow band-pass filter or an equivalent or an alternative form of integrating device, the critical ranging represented by the dotted curve in Figure 2 can be realized. A wide variety of modification and substitution of the other portions of the system in the block diagram will be self evident to those skilled in the art and accordingly the appended claims should be allowed a latitude of interpretation consistent with the spirit and scope of the invention.

What I claim:

1. Radio ranging apparatus including a combined oscillator and mixer, a frequency modulator coupled to said oscillator, combined radiating and echo-receiving means coupled to said oscillator, and a band-pass filter coupled to said oscillator to abstract heterodyne output therefrom, said band-pass filter being tuned to reject all frequencies outside the band corresponding to the doppler-shift in the echo-signals frequencies received by said antenna from relatively moving objects to be detected, the modulation frequency of said modulator being greater than the half band width of said filter.

2. Radio ranging apparatus including a combined oscillator and mixer, a periodic frequency modulator coupled to said oscillator, combined radiating and echo-receiving means coupled to said oscillator, whereby the locally produced periodically modulated signal is cross-multipiled with reflected and frequency-shifted signals from relatively moving objects, a band-pass filter for integrating the cross-multiplication products, the modulation frequency of said modulator being greater than half band width of said band-pass filter, and utilization means responsive to an amplitude characteristic of said integrating means.

3. Apparatus according to claim 2 wherein said periodic modulator includes a complex modulation waveform generator.

4. Apparatus according to claim 2 wherein said modulator includes a square-wave generator.

References Cited in the file of this patent

UNITED STATES PATENTS

| | | |
|---|---|---|
| 2,268,587 | Guanella | Jan. 6, 1942 |
| 2,426,228 | Mackta | Aug. 26, 1947 |
| 2,454,673 | Sanders | Nov. 23, 1948 |
| 2,508,400 | Kiebert | May 28, 1950 |
| 2,522,367 | Guanella | Sept. 12, 1950 |
| 2,532,221 | Bradley | Nov. 28, 1950 |
| 2,533,871 | Blitz | Dec. 12, 1950 |
| 2,557,864 | Doremus | June 19, 1951 |
| 2,570,235 | Higonnet | Oct. 9, 1951 |

FOREIGN PATENTS

| | | |
|---|---|---|
| 585,988 | Great Britain | Mar. 4, 1947 |